United States Patent [19]

Vale

[11] 4,217,563
[45] Aug. 12, 1980

[54] SURFACE WAVE PHASE CORRELATOR AND MONOPULSE RADAR SYSTEM EMPLOYING THE SAME

[75] Inventor: Christopher R. Vale, Elkridge, Md.

[73] Assignee: Westinghouse Electric Corp., Pittsburgh, Pa.

[21] Appl. No.: 642,802

[22] Filed: Dec. 22, 1975

[51] Int. Cl.² .............. H03H 9/30; H03H 9/26; H03H 9/04; H01L 41/22
[52] U.S. Cl. .................. 333/150; 29/25.35; 29/594; 333/193
[58] Field of Search ........... 333/30 R, 72, 150–155, 333/193–196; 310/8, 8.2, 9.8, 313; 235/181; 343/100 CL; 29/25, 35, 594; 364/821

[56] References Cited

U.S. PATENT DOCUMENTS

| | | | |
|---|---|---|---|
| 3,660,647 | 5/1972 | Pryor, Jr. | 235/181 |
| 3,701,147 | 10/1972 | Whitehouse | 333/30 R |
| 3,723,916 | 3/1973 | Speiser et al. | 333/30 R |
| 3,770,949 | 11/1973 | Whitehouse et al. | 235/181 |
| 3,896,442 | 7/1975 | Heminway et al. | 235/181 X |
| 3,917,401 | 11/1975 | Stolwyk | 310/9.8 |
| 3,961,290 | 6/1976 | Moore | 333/30 R |

OTHER PUBLICATIONS

Smith et al., "Design of Surface Wave Delay Lines with Interdigital Transducers" in IEEE Trans. on Microwave Theory and Techniques, vol. MTT-17, No. 11, Nov. 1969; pp. 865-873.

*Primary Examiner*—Marvin L. Nussbaum
*Attorney, Agent, or Firm*—E. F. Possessky

[57] ABSTRACT

A surface wave phase correlator comprises a pair of substantially identical launch and receiving filter electrode patterns disposed on a common piezoelectric substrate. The correlator is employed with receiving and processing circuitry in a monopulse radar system to provide relative phase information for target calculations by a digital processor. Fast rise and fall times for the correlator output signals enable rapid digital processing of incoming target signals.

1 Claim, 10 Drawing Figures

$f_O$ = CENTER FREQUENCY

SURFACE WAVE PHASE CORRELATOR AND MONOPULSE RADAR SYSTEM EMPLOYING THE SAME

BACKGROUND OF THE INVENTION

The present invention relates to surface wave devices and to monopulse surface radar systems.

In various applications, it is desirable to filter pairs of signals without introducing error in the phase difference between those signals. Further it is desirable to do so with relatively low cost and with reliability in performance.

In monopulse radar systems crystal filters have been employed for this purpose, i.e. to generate accurate phase information about two related target return signals for the purpose of making target calculations. Such filters have been relatively costly to make and their physical size requires relatively large ovens for ovenizing where wide temperature stabilization requirements exist. Further, the signal transfer characteristics of the crystal filters are such that the filtered output signals have relatively long rise and fall times thereby restricting target calculation rates in radar systems.

Surface wave devices have been developed in recent years for filtering and other circuit functions. For example, an article entitled "Surface Waves Emerge From The Lab And Into The Real World" and published by the present inventor in the September 20, 1975 issue of EDN magazine, sets forth general background information on surface wave device developments. Some U.S. patents in this subject matter area include Hartmann 3,755,761 which issued August 28, 1973 and discloses a surface wave transversal frequency filter having multiple filter sections on a common substrate for filtration purposes but not phase correlation purposes; and Whitehouse 3,757,256 which shows a surface wave device having multiple launch electrodes. No known application of surface wave technology has been directed to the phase correlation problem outlined above.

SUMMARY OF THE INVENTION

A surface wave phase correlator device comprises a pair of substantially identical launch and receiving electrode arrays which function as filters operative to pass a predetermined center frequency. The respective filters are commonly mounted on a piezoelectric substrate. Phase error contributed by the device is relatively small because of the substantial identity of the electrode patterns and the commonality and therefore small atomic plane variation of the substrate.

In a monopulse radar system, return signal pairs are amplified and mixed to a lower frequency and then applied to the surface wave correlator device. Output signals from the correlator device have relatively little phase error and fast rise and fall times so that a digital processor acts on the output signals with faster target calculation capabilities for the system as a whole.

DESCRIPTION OF THE PREFERRED EMBODIMENT

Figure 1:
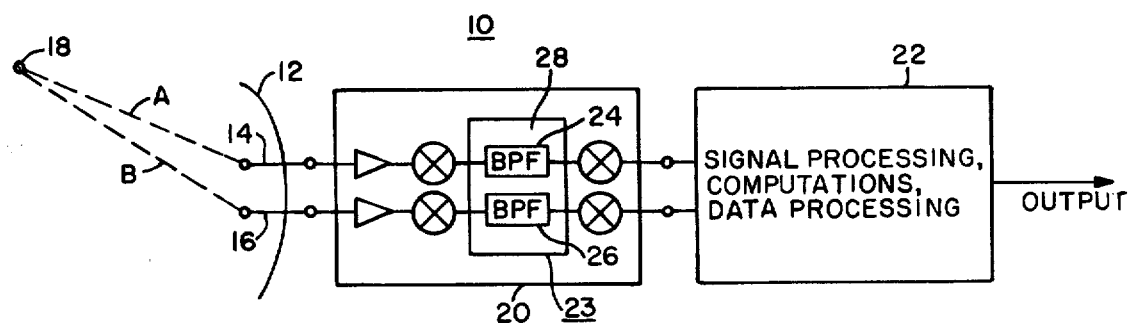
FIG. 1 shows a schematic view of portions of a monopulse radar system employing the present invention.

More particularly, there is shown in FIG. 1 the relevant portions of a monopulse surface radar system 10 in which the principles of the invention are employed. An antenna 12 includes spaced receiving elements 14 and 16 which respectively receive return signals or pulses A and B from a target 18. The return signals A and B are slightly phase displaced because the respective path lengths from the target 18 to the receiving elements 14 and 16 are slightly different. Channel signals A and B comprise the return signals A and B as well as any other signals which may reach the receiving elements 14 and 16.

Figure 2:
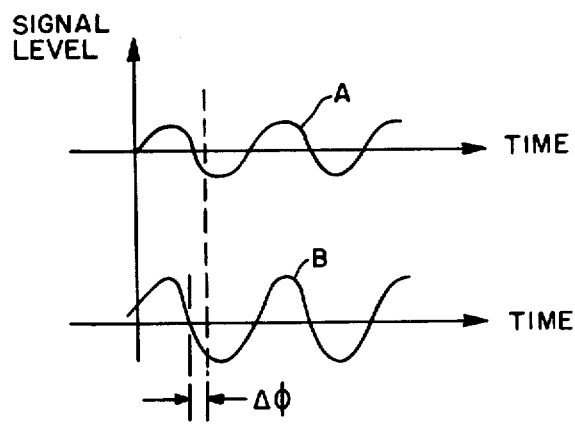
FIG. 2 illustrates the measurement of a phase difference.

Processing circuitry 20 filters the channel signals A and B so that only the return signals A and B are transmitted for downstream processing, mixes the return signals A and B to a lower frequency such as 30 MC, and amplifies the return signals A and B. The functions performed by the processing circuitry 20 must be performed substantially without the introduction of phase displacement of the return signals A and B since target location computations critically depend on accurate calculation of the phase difference $\Delta\phi$ (FIG. 2) between the return signals A and B.

The phase characteristic of a band pass filter is normally steeply sloped in the band pass region thereby introducing significant phase error possibilities in the processing circuitry 20. Substantially identical filter circuitry must accordingly be employed in the circuit channels A and B to prevent erroneous phase displacement of the A and B signals. The phase characteristics of amplifier and mixing circuitry are normally sufficiently flat that no significant phase error is produced on the signals A and B in the narrow band pass region.

At the output of the circuit box 20, the processed signals A and B are applied to additional processor circuitry 22 for any needed additional signal filtering and processing, phase and target computations and data processing. The box 22 can and preferably does include a digital computer for the signal phase difference and target calculations. The outputs from the processor 22 can include display signals and signals which indicate a control action to be taken.

In the prior art, a pair of ovenized, variable crystal filters have been employed to provide for comparing phase information in parallel chains of radar return signals. Such filter structure is physically large, requires large oven input power for temperature stabilization during operation, and is costly because skillful tuning time is required to obtain phase matching of paired filters.

Figure 3A:
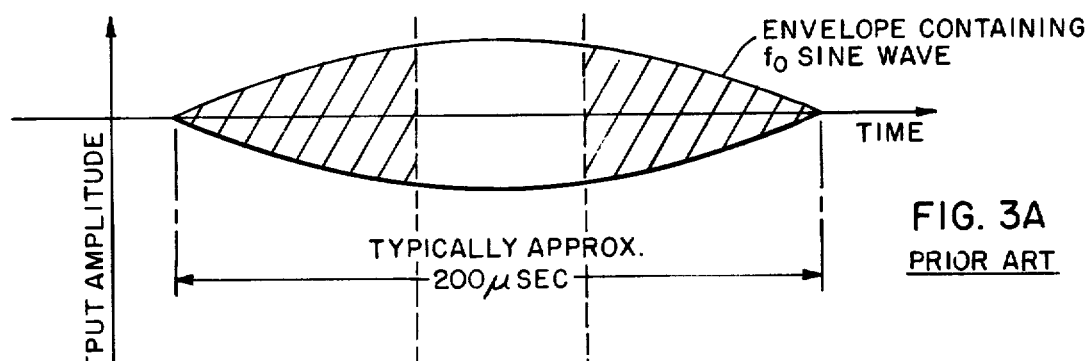
FIGS. 3A and 3B respectively show operation of filters in the prior art and in accordance with the present invention.

Radar systems employing such prior art filters have exhibited limited system performance because the digital phase comparison calculations require a relatively flat topped signal, i.e. a flat topped envelope over a sinusoidal signal having the band pass center frequency. Yet the response characteristics of the crystal filters are such that the filter output signal has relatively long rise and fall times as shown in FIG. 3A. As a consequence, the prior art radar system requires the wastage of some circuit processing time indicated by the shaded area in FIG. 3A in the development of filter outputs which are employed in marking target calculations. The digital processor must sit idle during this wasted time until the filter completes the signal pass, instead of making other target calculations on additional possible return signals which might otherwise be passed by a more efficient filter.

As indicated in FIG. 1, the radar system 10 employs a surface wave phase correlator device 23 comprising a pair of band pass filters 24 and 26 which are preferably commonly structured as surface wave device filters on a single piezoelectric substrate 28. By "common substrate" it is meant to refer to a single substrate block on which the filter electrode structures are disposed, or such a substrate block which has been divided into two separate filter parts.

Figure 3B:
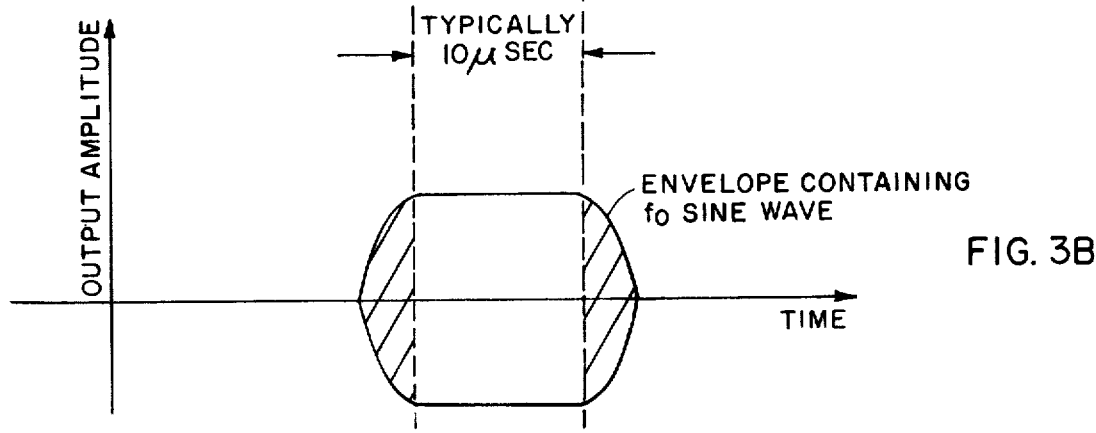

With employment of the kind of finger electrode structure subsequently described herein, the filters 24 and 26 provide nearly rectangular output signals as shown in FIG. 3B. As a result, better radar system performance is realized through improved target calculation capability.

Figure 4:
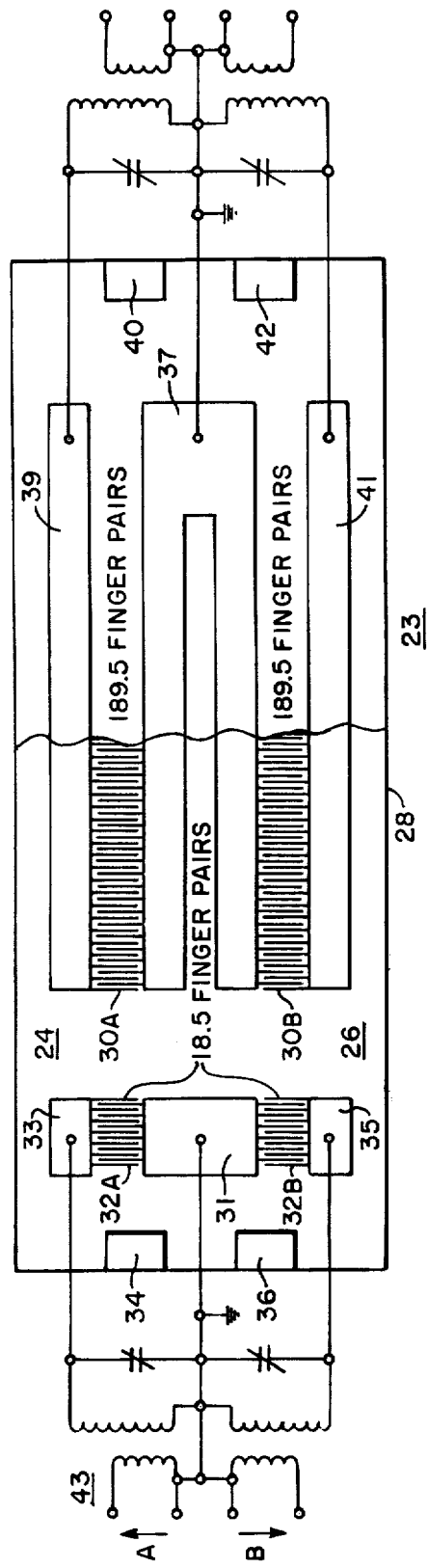
FIG. 4 illustrates, partially schematically and partially broken away, a surface wave phase correlator structure made in accordance with the present invention.

As shown in greater detail in FIG. 4, the surface wave filter device or phase correlator 23 preferably comprises a piezoelectric substrate 28, although in broad band and other applications of the invention it may be desirable to employ a nonpiezoelectric substrate such as fused quartz on which there is bonded a layer of piezoelectric material having high energy coupling efficiency such as one of the thallium materials described in copending Ser. No. 540,195, now U.S. Pat. No. 3,973,149, assigned to the present assignee. In the preferred structure, the piezoelectric substrate 28 can be made from ST cut piezoelectric quartz, and the launching and receiving electrode structures for the two filters 24 and 26 can be formed from suitable conductive material such as aluminum. Further, the electrode structure is preferably formed by means of a photoetching process in which there is employed a mask produced by photoreduction from a larger pattern.

The launch electrode structure comprises a common electrode 31 and electrodes 33 and 35 respectively spaced therefrom in a direction transverse to the surface wave travel direction and electrically coupled in the A channel filter 24 and the B channel filter 26. Thus, the input channel signal A is applied across the launch electrodes 31 and 33 and the input channel signal B is applied across the launch electrodes 31 and 35.

Interdigitated launch finger electrode pairs 32A are connected to the electrodes 33 and 31 and interdigitated launch finger electrode pairs 32B are connected to the electrodes 35 and 31. To avoid phase error in the processing of the A and B signals, the A channel finger pairs 32A and the B channel finger pairs 32B are structured identically i.e. equal in number, size, spacing and orientation.

At a location spaced along the surface wave travel direction over the substrate 28, the receiving electrode structure comprises an elongated common receiving electrode 37 and elongated electrodes 39 and 41 respectively spaced therefrom in the transverse surface wave direction and electrically coupled in the A channel filter 24 and the B channel filter 26. Interdigitated receiving finger electrode pairs 30A are connected to the receiving electrodes 39 and 37 and interdigitated receiving electrode pairs 30B are connected to the receiving electrodes 41 and 37. The finger pairs 30A and 30B are also identically structured to avoid phase error. The common receiving electrode 37 is U-shaped, but as one alternative it could be rectangularly shaped.

Further, respective absorbing blocks 34 and 36 are disposed on the substrate 28 to absorb launched surface waves traveling to the left of FIG. 4 and thereby prevent reflective waves traveling to the right. Similarly, absorptive block 40 and 42 prevent leftwardly reflected surface waves from the downstream end of the substrate 28 after the launched surface waves have traveled beyond the receiving electrode structure. A suitable adhesive material for the absorptive blocks is RTV or beeswax.

It is noted that a transformer and a tuning capacitor (indicated schematically in FIG. 4) form a circuit 43 across each pair of input and output terminals of the filters 24 and 26 for impedance matching and efficient energy coupling with upstream and downstream circuitry in the radar system. Generally, the metallized pattern on a quartz blank provides a relatively high impedance such as 10 KOHMS to 100 KOHMS while typical interfacing solid state circuitry is characterized with a low impedance level such as 50 OHMS, thereby creating a need for impedance matching.

The impedance matching transformer and capacitor elements may be housed with the substrate 28 in a single container in forming the device 23. Although a perfect match is not provided by this circuitry, it can typically increase signal output level by as much as 30 DB. Further, this circuitry provides some moderated filtering of unwanted acoustic wave responses such as bulk modes and overtones. Finally, the phase characteristic of a typical matching circuit 43 is adequately wide to avoid any contribution to phase error.

Surface wave devices are inherently time domain devices, i.e. the traveling mechanical surface wave is induced in the substrate by electric fields produced by the applied signal across the launching electrode finger pairs traverses the substrate surface with a velocity characteristic of the substrate as defined by $$v_s = f_o \lambda_s$$

where
  $f_o$ = operating frequency
  $\lambda_s$ = wave length of surface waves.

As the traveling wave progresses under the receiving electrode structure, successive receiving electrode finger pairs have electric fields induced between the paired fingers to produce additive time successive signals across the receiving electrodes. The filter output signal takes a form dependent on the number of receiving electrode finger pairs and the finger width and spacing and the finger overlap.

Figure 5:
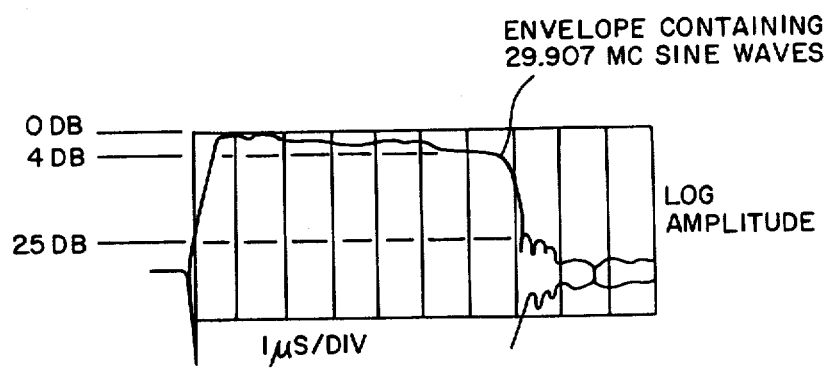
FIGS. 5 and 7 respectively show impulse and steady state responses of the device of FIG. 4.

Since a rectangular output signal is desired for the reasons set forth previously, substantially uniform overlap of receiving fingers is employed in each filter 24 or 26. Only some of the receiving fingers are shown because of the large number provided. However, some progressively greater overlap (not illustrated) can be employed for the receiving fingers as a function of increasing distance of the receiving finger pairs from the launching electrodes. The purpose of the alternative finger overlap weighting is to compensate for surface wave energy loss with travel and thereby produce the desired flat topped signal rather than an approximately flat topped signal like the measured signal shown in FIG. 5 for an actual device built like the device of FIG. 4. Further, the number of receiving fingers electrode pairs 30A or 30B is in this case 189.5 in order to provided rectangular time domain output signal approximately 7μ seconds long at a center band pass frequency of about 30 MC.

Figure 6:
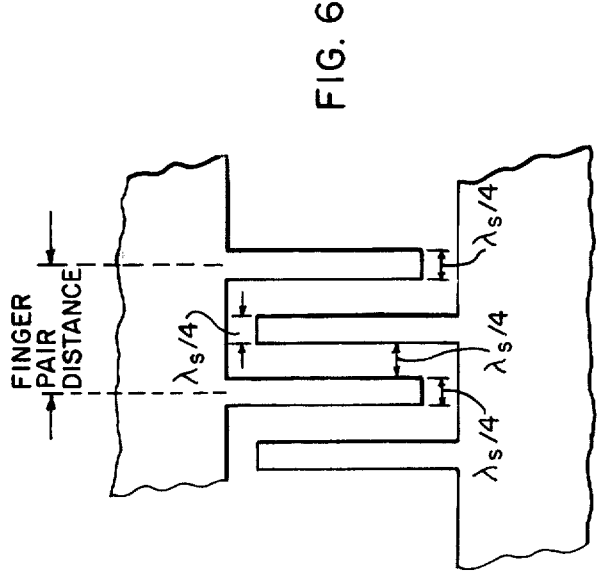
FIG. 6 shows in greater detail the structure of finger electrodes employed in the device of FIG. 4.

The width of each launching finger and each receiving finger and the finger spacing is preferably made equal to $\lambda_s/4$, i.e. $v_s/4f_o$ (FIG. 6). In this manner, the distance between fingers in successive finger pairs is made equal to the wave length corresponding to the desired center pass frequency.

Generally, the filters 24 and 26 pass the sine wave input of correct frequency because successive receiving fingers produce synchronously additive signals. Lower and higher frequency inputs or off frequency signals tend to be filtered out by cancellation at the receiving electrodes because they are asynchronous with the metallized array.

The number of launcher finger pairs 32A or 32B in each filter 24 or 26 is in this case made equal to 19.5 which is a number sufficiently large to obtain an appropriately energized surface wave yet which is sufficiently small, relative to the number of receiving finger pairs, that the rise and fall times of the filter output signal are short enough to enable the output to be characterized as a rectangular wave and enable achievement of the improved radar system target calculating performance previously described. Launch finger overlap is preferably uniform.

Figure 7:
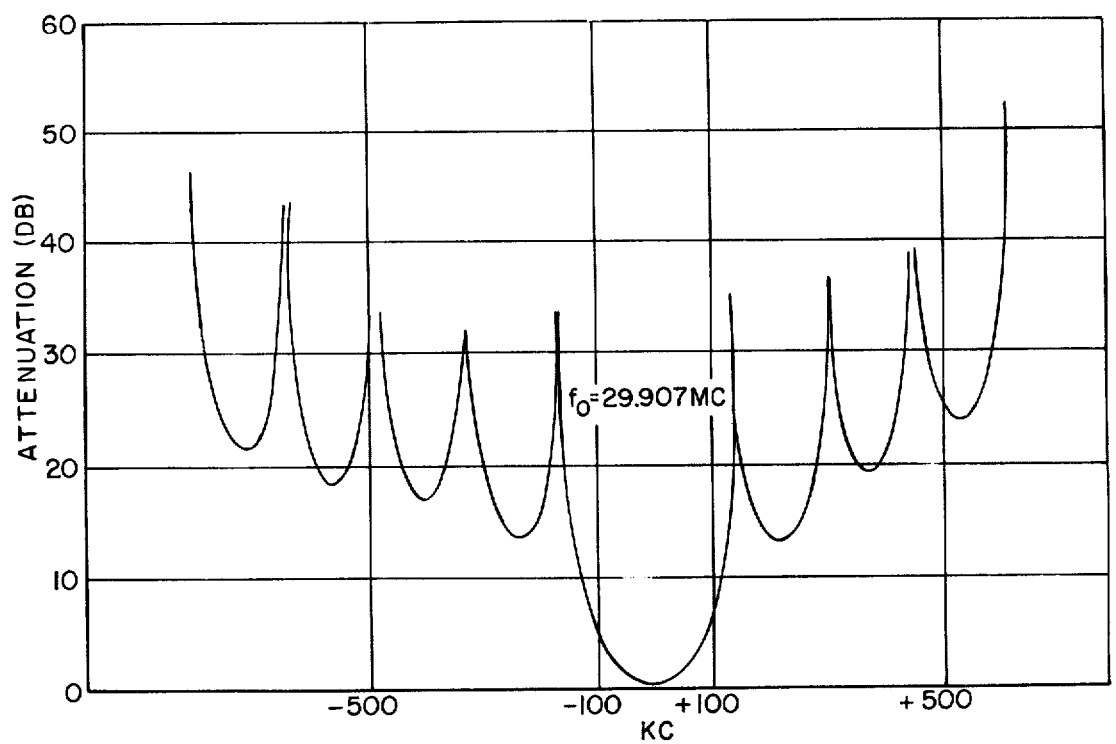
Figure 8:
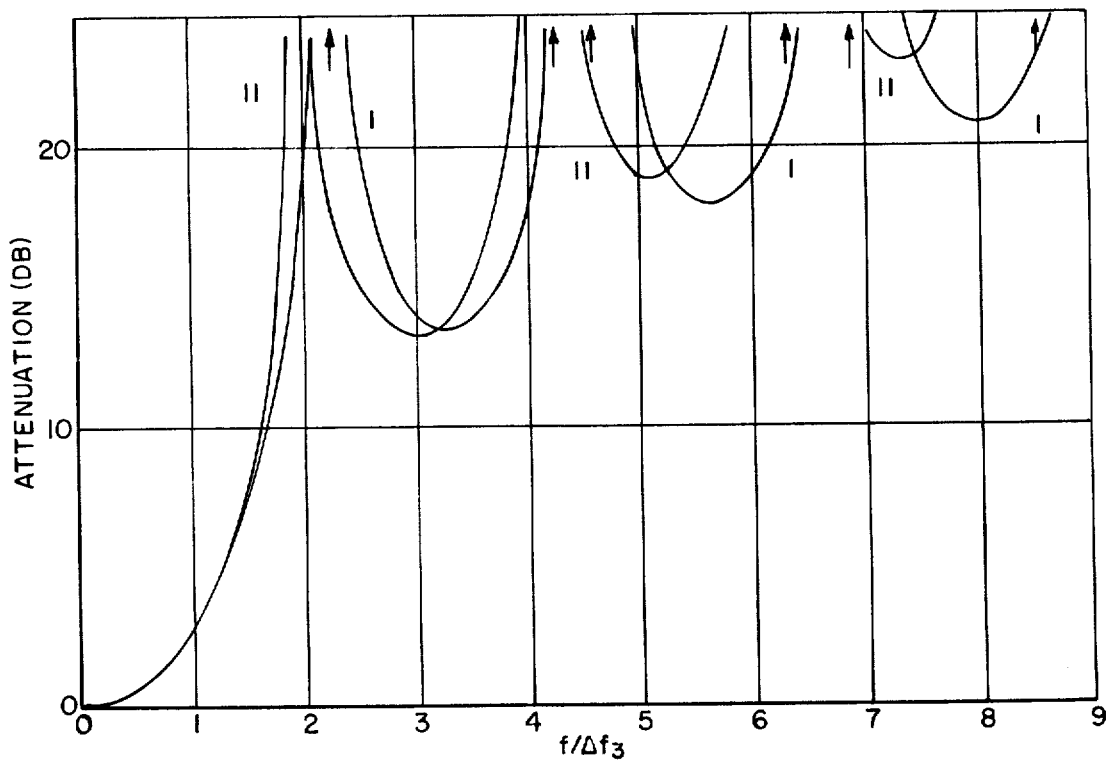
FIG. 8 shows the measured steady state response of the device with an ideal sin x/x response.

As previously indicated, FIG. 6 shows the time responses of a pair of filters in an actual device like the one of FIG. 4. A good approximation to a rectangular envelope is achieved virtually identically by the two filters. The corresponding steady state response, i.e. the Fourier transform of the impulse response, is shown in FIG. 7, and it is close to sin x/x which is the Fourier transform of a rectangular time response as illustrated in FIG. 8. The 4 DB droop and 25 DB overshoots can be eliminated by adjustments in the finger overlap structure as already indicated.

Figure 9:
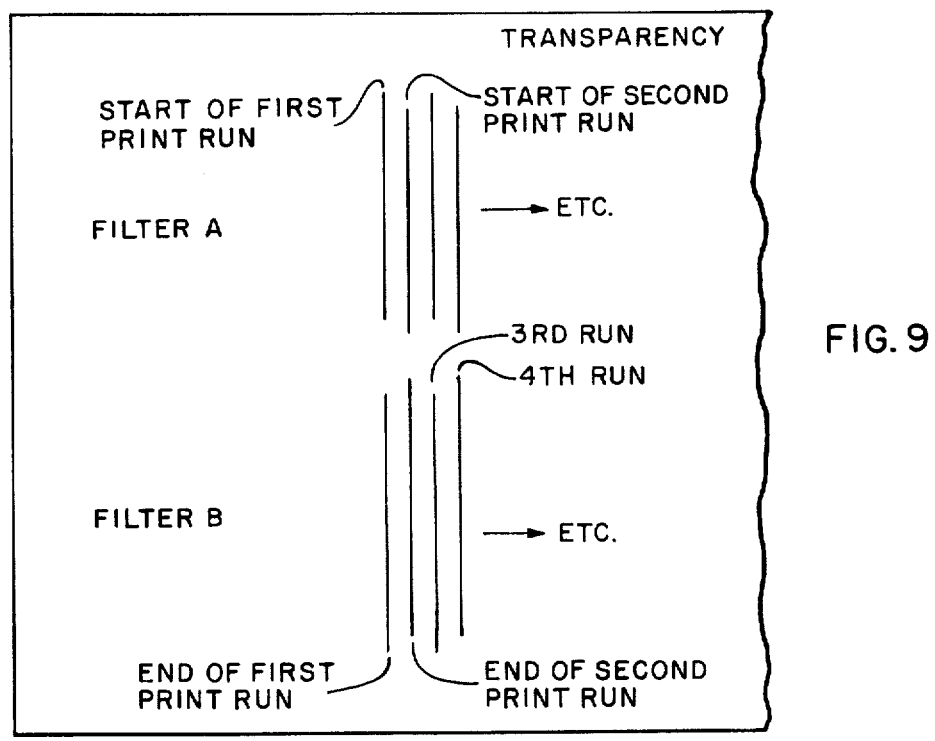
FIG. 9 shows a schematic diagram of the manner in which a computer operated graphic device generates a transparency in the manufacture of devices in accordance with the invention.

In the manufacture of the device 23, it is preferable that a digital computer be employed in driving a graphic device to lay out the finger electrodes on a relatively large transparency (such as 2 feet by 3 feet). Further, as shown in FIG. 9, it is preferable that the corresponding electrode fingers in the two filters be printed in sequence as part of the same pen run before the computer calculates the placement of and drives the pen to the location of the next set of corresponding fingers in the two filters. In this way, the placement of corresponding fingers of the two filters along the length of the piezoelectric substrate will be virtually identical. Bulk electrode structure can be added to the computer printed fingers by a draftsman if desired.

Next, the transparency is reduced in size such as by 20 to 1, i.e. until the finger spacing equals the desired $\lambda s$ or about 100 microns in the case of $F_o = 30$ MC. A mask is finally created and it is used with an ultraviolet camera and photoresist material to photoetch the created electrode pattern on the aluminum or other conductive material which has been bonded to the quartz substrate. As an illustration of relative size for a 30 MC filter device, the substrate may be $\frac{1}{2} \times 1\frac{1}{2} \times 0.05$ inches and the receiving electrodes may be $\frac{3}{4}$ inches long with a spacing of 0.06 inches between electrodes for the electrode fingers.

In the final product, phase error preferably is kept within limits of ±0.01%. Thus, no more than 16 Å error in spacing between each finger pair can exist for 0.01% phase error, and with the described manufacturing process considerably less spacing error is realized because the relative electrode spacing is computer generated to be virtually identical and the optics reduction error (due to nonuniformity in field reduction) can be in the area of about 1 PPM which is well below the 16 PPM reduction error allowable in correspondence to the 16 Å allowable finger spacing error. Further, an error in substrate atomic plane orientation as high as 2' of arc is tolerable, and with the use of a common substrate as defined face orientation error is kept relatively low. A report by A. J. Miller in the 24th Annual Frequency Control Symposium indicates that atomic plane misalignment of 1' of arc error is a worst case for a common substrate like the one disclosed herein.

In the actual device for which the response in FIG. 6 was obtained, it was demonstrated that phase error was substantially within the limits of ±0.01%. Thus, each filter output was mixed with a signal of such frequency that a single sine wave resulted. A computer counter with start-stop interpolators was employed to provide an acceptable measurement error of about 80 CPS in a time interval of 6.5 μsec. The two impulse responses were verified to be 327 CPS apart by dividing down the mixing frequency to have a coherent trigger for the surface wave filter impulse. This corresponds to a phase error of 0.0011% for a center frequency of 29.907 MC. In terms of degrees, a typical phase difference between the two surface wave device channels is 0.7° which is well within the upper allowable phase error limit.

As a result of the small phase error introduced by the filters 24 and 26, relative phase information between two return radar pulses can be more efficiently processed and held for comparison. Over wide temperature environments, ovenizing is required but the required oven can be about 1/50 the size of that required by conventional crystal filters. Reliability is improved because of a relatively reduced number of components. Cost reduction is also realized for reasons including the fact that costly filter tuning is eliminated. A further advantage of the surface wave device 23 is that it is potentially integrable on a common substrate with upstream and downstream circuitry to form common surface wave circuitry in the processing chain. The device itself is especially adapted for achieving improved radar system operation, but it has potential use in other applications where filtering with high phase accuracy is required.

What is claimed is:

1. A method for making a surface wave phase correlator device having a common substrate member with at least a top layer portion thereof formed from piezoelectric material, a first pair of launching electrode means disposed on the top surface of said substrate member and spaced from each other in a first direction over the surface, a first pair of receiving electrode means disposed on the top surface of said substrate member and spaced from said first launching electrode means pair in a second surface wave travel direction and from each other subtantially tranversely of the wave travel direction in the first surface direction, a second pair of launching electrode means disposed on the top surface of said substrate member and spaced from each other in the first surface direction and aligned with said first launching electrode means pair in the first surface direction, a second pair of receiving electrode means disposed on the top surface of said substrate member and spaced from said second launching electrode means pair in the wave travel direction and from each other and from said first receiving electrode means pair in the first surface direction, a first plurality of launching electrode finger pairs interdigitated between said first launching electrode means to provide a predetermined center pass frequency for said first launching and receiving electrode means pair, another plurality of launching electrode finger pairs interdigitated between said second launching electrode means and substantially identical in structure with said first plurality of launching electrode finger pairs, and a second plurality of receiving electrode finger pairs interdigitated between said first receiving electrode means pair, and another plurality of receiving electrode finger pairs interdigitated between and receiving electrode means and substantially identical in structure with said second plurality of receiving electrode finger pairs, said method comprising the steps of marking at least a magnification of the electrode finger structure on a transparency by means of a computer controlled graphic system, employing the graphic system in the marking step to make successive common passes over the transparency in a given direction and in each pass marking corresponding electrode fingers in the first and second launching electrode means or corresponding electrode fingers in the first and second receiving electrode means, marking any additionally needed electrode structure on the transparency, photoreducing the transparency to the masking size required for electrode disposition on the substrate operating surface, and disposing conductive material on the device operating surface in accordance with the mask resulting from the photoreduction processing.

* * * * *